United States Patent
Bakshi et al.

(10) Patent No.: US 6,574,663 B1
(45) Date of Patent: Jun. 3, 2003

(54) ACTIVE TOPOLOGY DISCOVERY IN ACTIVE NETWORKS

(75) Inventors: Sanjay Bakshi, Hillsboro, OR (US); Satyendra Yadav, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/386,864

(22) Filed: Aug. 31, 1999

(51) Int. Cl.[7] .............................................. G06F 15/173
(52) U.S. Cl. ...................... 709/223; 709/104; 709/105; 709/220; 709/221; 709/222; 709/224; 709/225; 709/226; 709/229
(58) Field of Search ................................ 709/104, 105, 709/220–229

(56) References Cited

U.S. PATENT DOCUMENTS

| | | | |
|---|---|---|---|
| 4,644,532 A | * 2/1987 | George et al. .............. 370/255 |
| 5,049,873 A | * 9/1991 | Robins et al. ......... 340/825.06 |
| 5,442,791 A | * 8/1995 | Wrabetz et al. ............. 709/330 |
| 5,583,991 A | 12/1996 | Chatwani et al. ........... 709/223 |
| 5,586,267 A | 12/1996 | Chatwani et al. ........... 709/223 |
| 5,729,685 A | 3/1998 | Chatwani et al. ........... 709/224 |
| 5,841,972 A | * 11/1998 | Fanshier ..................... 709/220 |
| 5,850,397 A | 12/1998 | Raab et al. ................. 370/392 |
| 5,884,036 A | 3/1999 | Haley ......................... 709/224 |
| 6,185,612 B1 | * 2/2001 | Jensen et al. ............... 709/223 |
| 6,226,788 B1 | * 5/2001 | Schoening et al. ............ 717/6 |
| 6,243,746 B1 | * 6/2001 | Sondur et al. .............. 709/220 |
| 6,286,038 B1 | * 9/2001 | Reichmeyer et al. ....... 709/220 |
| 6,330,600 B1 | * 12/2001 | Matchefts et al. .......... 709/223 |
| 6,347,398 B1 | * 2/2002 | Parthasarathy et al. ..... 717/178 |
| 6,397,381 B1 | * 5/2002 | Delo et al. .................. 717/174 |

* cited by examiner

*Primary Examiner*—Nabil El-Hady
(74) *Attorney, Agent, or Firm*—Fish & Richardson P.C.

(57) ABSTRACT

Techniques for operating a network by using a first database with topological information of linked devices and a second database with topological information, software resources, and available hardware resources of certain programmable devices to adapt to changes of the network.

24 Claims, 4 Drawing Sheets

ACTIVE TOPOLOGY DISCOVERY IN ACTIVE NETWORKS

BACKGROUND

The present disclosure generally relates to electronic networks, and more particularly, to discovery of the network topology, operation and management of networks.

An electronic network includes different electronic devices connected to communicate with one another through communication links such as electrical cables, optic fibers, wireless links, or a combination of these. Linked electronic devices, e.g., computers, their peripherals, and other information processing devices, can exchange data and share various hardware and software resources over the network. Certain linked electronic devices may be configured and designated to forward data and perform network management. Network servers, routers, switches, and bridges are examples of such devices. Two or more networks may be connected to one another to form a greater network.

The topology of a network, i.e., physical layout of the interconnections among linked electronic devices, is an important aspect of the network because it affects the communication within the network. Designated network devices such as switches and routers determine paths for forwarding data packets over the network according to the topological configuration. A given network topological configuration may change over time. Keeping track of such changes is often referred to as "topology discovery." Routers often use one or more routing protocols to exchange routing information with one another. Each router can maintain its own updated routing table or topological map of the entire network topology.

For example, the Open Shortest Path First ("OSPF") protocol has been used in networks based on Internet Protocol ("IP") to determine the best routing path within an autonomous system where routing among linked devices is controlled under one routing protocol. Each router running OFPF maintains its own updated topological map of the entire network which is referred to as a link state database. The OSPF protocol may use one of link state parameters indicating the attributes of different paths between two devices in the network to determine the best path. Examples of link state parameters include latency, throughput, hop count, path cost, path reliability, and others. The choice of the best path may change with link parameters selected between two devices.

SUMMARY

The present disclosure provides methods for operating a network by using two different databases. A first database has information about topology of devices connected in the network. The second database has information about at least topology, software and hardware configurations of selected devices that have predetermined device attributes. The information in the first and second databases is combined to choose a suitable selected device to perform a function when the function is installed, or to install the function in the suitable selected device when the function is not installed in the network.

The selected devices may be active devices which are programmable to install and perform a new function while being connected to the communication links in the network. The network may also have passive devices which are devices whose functions cannot be modified while connecting to the network. At least one active topology server is connected to communicate with both the passive and active devices.

The active topology server can be configured to maintain a first database on topology of all of the passive and active devices and a second database on topology, software and hardware configurations of only the active devices. The first and second databases are combined to select a desired active device based on its network location, software, and hardware to perform or install a function.

These and other aspects of the present disclosure will become more apparent in light of the following detailed description, the accompanying drawings, and the appended claims.

DETAILED DESCRIPTION

Figure 1A:
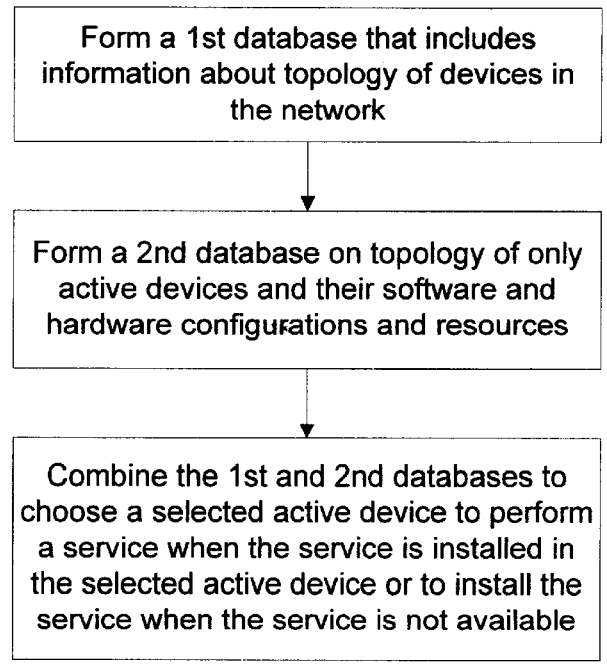
FIG. 1A shows a method for operating a network having active and passive devices by forming a first database of the overall topology of the network and a second database of the active devices according to one embodiment of the disclosure.

Devices connected to a network may have different levels of functionality or different characteristics. Certain networking operations may involve only a certain type of devices having one or more desired attributes in the network without other types of devices. The information on that desired attribute of the certain type of devices, and its relation to the topology of the entire network, may become relevant or even critical in order to efficiently perform those certain networking operations.

Network management is one example of the above networking operations. Networks have become increasingly complex and diversified by expanding their hardware and software functions and configurations. New applications, such as Intranets, internal firewalls, priority business applications, multicast-based applications, multimedia applications, and others, may require a network to be active and adaptable. It is desirable to be able to reconfigure a network at least in part by reconfiguring and reprogramming certain linked devices to meet the changing needs of existing applications installed in the network, or to install new applications to expand the services of the network. Such reconfiguration may be accomplished without interrupting the normal operation of the network. Such a network will be referred to as being "active" in this disclosure.

One aspect of this disclosure is the recognition that devices linked to an active network may be divided into at least two different types, "active" devices and "passive" devices, based on their programmability during runtime. An active device can be configured and programmed to perform its existing service and to provide modified or new networking services while it is operating and connected to the network. This may be done by sending a mobile agent, i.e., a set of application-specific software routines and instructions, from a linked device (e.g., a server computer)

to the active device. The active device executes the mobile agent to modify one or more of its existing functions or to install a new application. A reprogrammable server and a reprogrammble router are examples of active devices.

Linked devices other than active devices can be passive devices whose existing functions cannot be changed during runtime. A router is a passive device if a change to its functionality must be made by interrupting its normal operation and link to the network. Hence, the instructions in a passive router may be updated or replaced by first disconnecting the router from the network, then uploading the instructions, and finally reconnecting the router to the network. Legacy devices are often also passive devices.

Updated information on certain aspects of the active, devices, including network locations of active devices, their installed software resources, and available hardware configurations, allows the programmability during runtime of the active devices. This makes the network active and adaptable on the fly. A passive device may perform its existing functions in response to commands or instructions from one or more active devices. Hence, active devices form the backbone of an active network and have greater impact on the network management than passive devices.

For example, a service or application may be installed in two or more active devices in the network. It can be invoked from any one of these active devices. However, the performance of that particular service may vary from one to another in these active devices because of differences in network locations, their processing speed, their memory capacity, or other factors. One high-performance active device may be overloaded with other applications so that it could not allocate sufficient resources for this specific application. Hence, another less-powerful active device may be more suitable for rendering that service. In another example, when two active devices have similar resources for performing the desired service on a third device, the one having a lower hop count or lower latency to the third device may be selected.

Therefore, it is desirable to delegate a service to an appropriate active device so that a particular service can be provided in an efficient way to achieve a desired level of performance and to use as few network resources as possible. In an analogy to the OSPF protocol for IP routing where the best path is used, an active network would choose the best active device to provide a service. When such service is not available, a best suited active device would be chosen for installing the service and providing the service. Hence, active devices may be managed differently from passive devices.

Another aspect of the present disclosure is to form and maintain a special database on the topology of only the active devices in the network and their respective software and hardware resources (e.g., installed applications, processor information, and data on memory units, etc.), in addition to the general topological map of all linked devices in the network. This special database on the active devices is automatically updated to get the current status of all active devices. The active network combines this special database with the general topology of all linked devices to determine whether an optimized active device is available, and if so, to select that optimized active device to perform a service. FIG. 1A shows a method for operating a network having active and passive devices by forming a first database of the overall topology of the network and a second database of the active devices.

The above process may be divided into two phases, a discovery phase where the general topology of all devices in the network and the active topology of only the active devices are discovered, and a service determination phase where an optimal active device for performing a service is determined. When a desired service is not available from the active devices, the server determination phase also selects an optimal active device to first install that new service and then to provide that service.

Figure 1B:
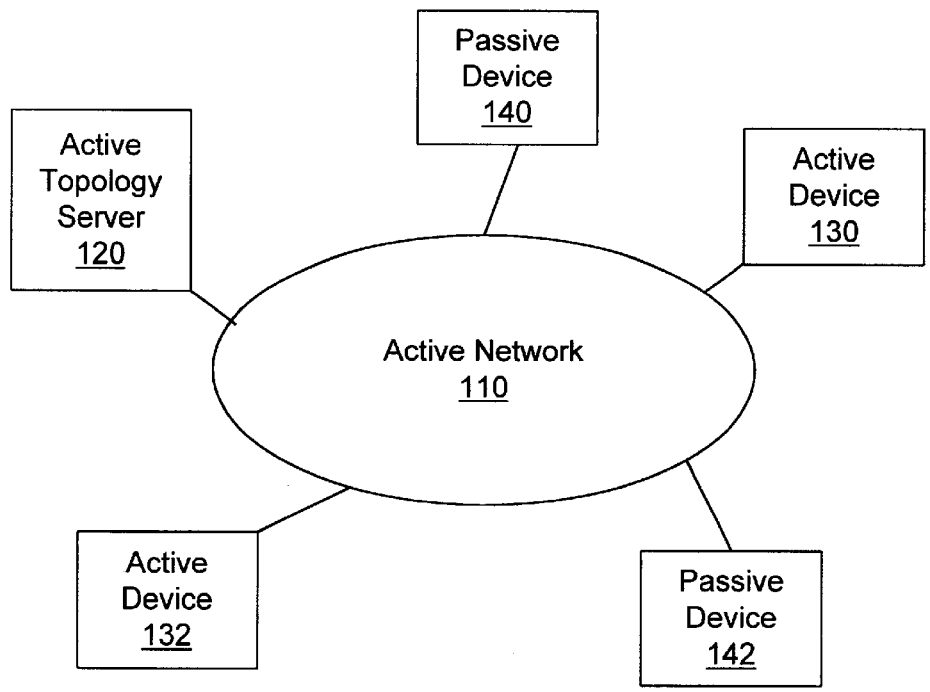
FIG. 1B is a block diagram illustrating an active network having active and passive devices according to one embodiment of the disclosure.

One embodiment of an active network includes at least one active topology server ("ATS"), a computer designated to implement the above two-phase process. FIG. 1B shows this active network 110 which comprises active devices 130, 132, etc. and passive devices 140, 142, etc. The active devices 130, 132, etc. may be distributed throughout the network 110 so that each active device can configure, manage, and control its own configuration and the passive devices in order to manage the entire network 110. An active topology server 120 is linked to communicate with all devices, both active and passive, in the network 110. The active topology server 120 may directly control the active devices and indirectly control a passive device through at least one active device that control that passive device.

Several special databases are formed and maintained in the active topology server 120. The active topology server 120 maintains a service database to list available services and hardware configurations in every monitored active device. Each service may be assigned a user priority level. A client on the network 110 having a high user priority level would get that service before a client having a lower user priority.

The active topology server 120 also maintains a general topology map of the entire network 110, including interconnections of all active and passive devices. The active topology server 120 can use this information to determine the best path between any two devices, specifically between any active device and any passive device, for a selected link parameter. For example, when a device requests a service, the active topology server 120 can find an active device offering the requested service that has a shortest path to the requesting device based on the general topology map.

The active topology server 120 also maintains an active topology map to indicate current connectivity among all active devices in the network 110 and the software and hardware resources or configurations in each active device. The information about the hardware may include the type of the processor, available RAM and space in the hard drive, the speed of communication ports, and so on. The information on the connectivity part of this active topology map may be derived from the general topology map.

Other functions may also be implemented. For example, the active topology server 120 may have a database on security for links from each active device to other devices. A map on various certificate authorities ("CAs") is kept in this database so a device may need to be signed by an appropriate CA in order to access a secured service.

The active topology server 120 may obtain information for the general topology of the entire network 110 by supporting a routing protocol adapted by the network 110. For example, if the network 110 is an IP-based network, the OSPF protocol can be used to form the general topology map in the active topology server 120. OSPF is a link state routing protocol for maintaining a complete record of the full topology of the network. Each device maintains an identical link state database which includes local link states of all devices in the network. The information on the topology at each router is updated whenever the network topology changes, or at a predetermined duration (e.g., 30 minutes), whichever occurs first. The active topology server 120 does not directly participate in the OSPF interactions among the active and passive devices but simply receives the OSPF Link State Advertisements of the linked devices to form its own topology database of the network 110. The general topology map of all active and passive devices is then derived from this database.

The network 110 implements a special active topology discovery protocol so that the active topology server 120 can communicate with the active devices 130, 132, etc. and passive devices 140, 142, etc. Based on such communication, the active topology server 120 maintains and updates the service database and active topology map in the discovery phase.

Figure 2:
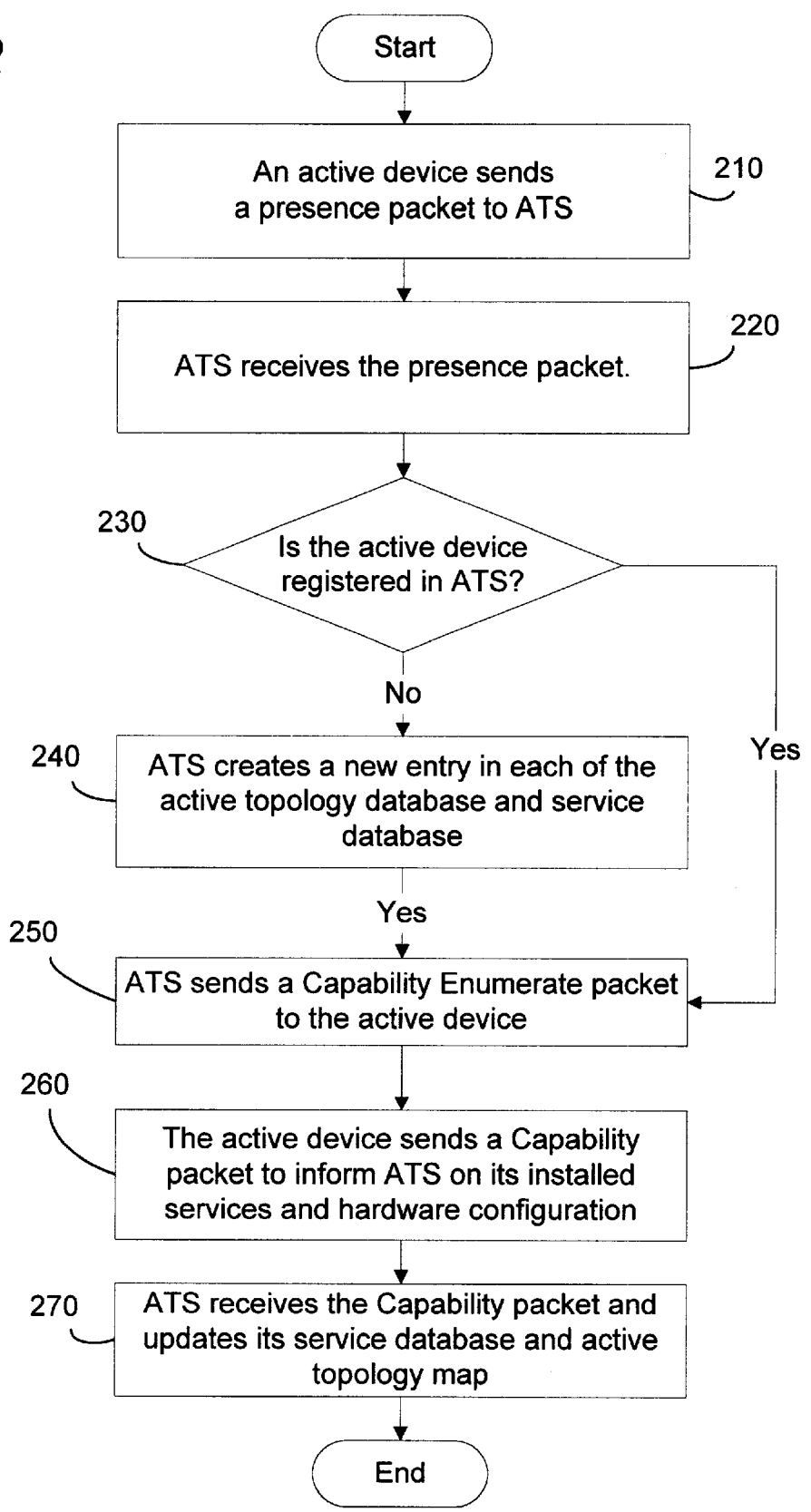
FIG. 2 is a flowchart showing one embodiment of a discovery protocol for the active network of FIG. 1.

FIG. 2 is a flow chart showing one embodiment of this discovery protocol. At step 210, each active device sends a "Presence" packet via a known communication port to inform the active topology server 120 that it is present on the network 110. The Presence packet includes sufficient information, such as the network address of the device, so that the active topology server 120 can establish communication with that device. This step may be performed when the active device is connected to the network 110 for the first time, or every time the device updates its status and reports to the Active topology server 120 during normal operation. In the latter case, the update may be made periodically or whenever the status of the device changes.

At steps 220 and 230, the active topology server 120 receives the presence packet and determines whether the active device is in the existing list of active devices stored in the active topology server 120. If the active device is new, the active topology server 120 creates an entry for the new device in each of its databases (step 240). Next, the active topology server 120 executes step 250 to send a "Capability Enumerate" packet to solicit information on installed services and hardware configuration of the active device. If the device is already listed, the active topology server 120 will directly execute step 250 to send the Capability Enumerate packet.

Next at step 260, the active device responds to the Capability Enumerate packet from the active topology server 120 and sends a "Capability" packet to inform active topology server 120 about its service and hardware capabilities. The active topology server 120 receives the Capability packet and updates its service database and active topology map accordingly. This completes the discovery phase for that particular active device. The above process repeats according to a temporal sequence (e.g., periodically) for the same active device and all other active devices in order to keep the databases in the active topology server 120 current.

Alternatively, the active topology server 120 may initiate the discovery process itself, instead of waiting for incoming presence packets from active devices. The active topology server 120 can send Capability Enumerates packets to each and every active device in its list to get updated information. This process includes steps 250 through 270. However implemented, it is desirable to repeat the discovery process frequently enough so that the data on all active devices in the network 110 and the general topology map for all active and passive devices are as current as possible. Such repetitive discovery process also detects any linked device that has disappeared in the network 110.

Figure 3:
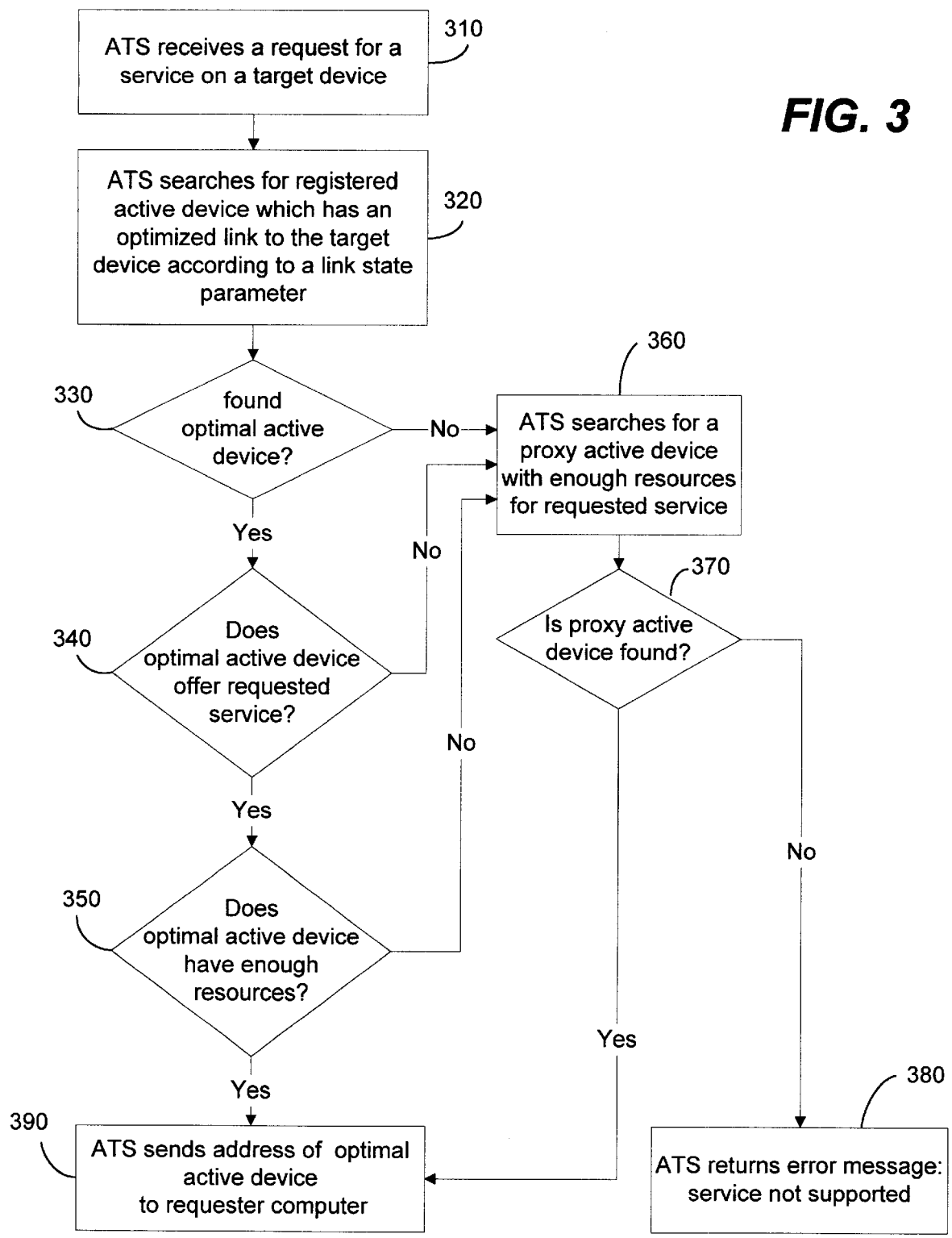
FIG. 3 is a flowchart showing one embodiment of a protocol for service determination in the active network of FIG. 1.

FIG. 3 shows one embodiment of a protocol for providing services in the service determination phase in the active network 110. A linked device, e.g., a network management computer, performs a management task on a target device linked to the network 110. At step 310, this device sends a request to the active topology server 120. The active topology server 120 then searches the active topology map of all active devices for an active device that has a link to the target device optimized for one or more link parameters (step 320). If an optimal active device is not found (step 330), the active topology server 120 searches for a proxy active device in its list which has enough available resources and offers the requested service at step 360. If an optimal active device is found in the list of the active topology server 120, the Active topology server 120 then determines whether that optimal active device offers the requested service at step 340 and further determines whether the optimal active device has sufficient resources to provide the service at step 350. If the decision is negative to either the step 340 or step 350, the active topology server 120 is directed to find a proxy active device in step 360. On the other hand, the decision is positive to both steps 340 and 350, the optimal active device is assigned by the active topology server 120 to perform the service to the target device. The active topology server 120 sends the network address of the optimal active device to the device that made the service request (step 390).

After execution of step 360, if the proxy active device is found, the active topology server 120 also delegates the service to the proxy active device by returning its network address to the requester device at step 390. If the proxy active device is not found, the network 110 will not be able to provide the requested service. At step 380, the active topology server 120 will so inform the requester device by sending an error message to indicate "service not supported."

Steps 320, 330, 340, and 350 may be executed in a different order from the order shown in FIG. 3. For example, the step 340 may be executed after step 310 so that the active topology server 120 first searches the service database for qualified active devices having the requested service installed. If the requested service is not installed in any of the active devices, the active topology server 120 exits the service determination by executing step 380. If only one active device having that requested service is found, the active topology server 120 proceeds to assign that active device to perform the service. Otherwise, the active topology server 120 selects one active device from two or more active devices offering the same requested service based on their connectivity and resources.

Figure 4:
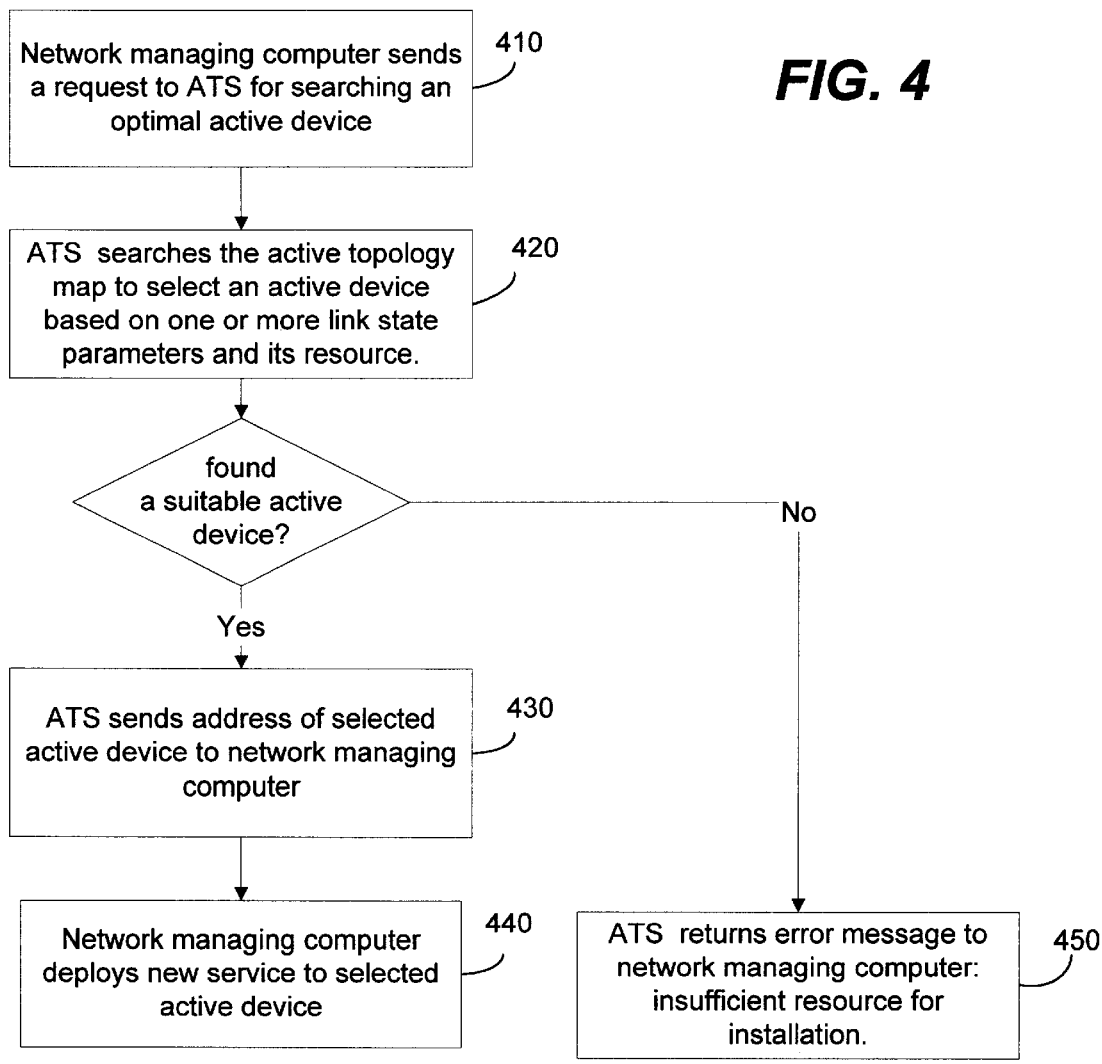
FIG. 4 is a flowchart showing one embodiment of a protocol for installing a new service in the active network of FIG. 1.

When a service is not installed in the network 110, a service installation protocol may be further implemented to find a suitable active device for installation. FIG. 4 shows one embodiment of an installation protocol. When a new service is needed in the network 110, a network managing computer sends a request to the active topology server 120 for an active device that is optimized for installing and providing the desired service (step 410). The request may identify the type of the service and a target device where the service is needed. At step 420, the active topology server 120 searches its active topology map to select an active device which has adequate resources for installing and providing the service. In addition, the active device is selected so that its connection to the target device is optimized for one or more link parameters. If the active device is found, the network address of the selected active device is sent to the network managing computer at step 430. At step 440, the network managing computer establishes communication with the selected active device and deploys that service. If the active device is not found, the active topology server 120 concludes the service cannot be installed without disconnecting the target device or other devices from the network 110 based on the current resources of the active devices. The active topology server 120 so informs the network managing computer as indicated by step 450.

The above protocols associated with the active topology map of an active network provide a dynamically-adjustable managing environment that adapts to a network with constant changes and expansion. The active topology mechanism in the active topology server monitors and captures the changes in the network. This mechanism continuously optimizes the performance of the network by selecting proper active devices for desired services. Hence, a particular network service may be performed from different active devices as the network evolves and a new service may be strategically deployed at a selected location to achieve an optimized performance.

Although a few embodiments have been described, various modifications and enhancements may be possible without departing from the following claims.

What is claimed is:

1. A method for operating a network, comprising:
   forming a first database that includes information about topology of devices connected in a network;
   forming a second database on topology of only selected devices that have predetermined device attributes among the devices, the second database including at least a software configuration and a hardware configuration of the selected devices; and
   combining the first and second databases to choose a selected device to perform a service when the service is installed in the selected device or to install the service in the selected device when the service is not installed in the network.

2. A method as in claim 1, wherein the predetermined device attributes include installing and performing a new service while connected to communicate with the network.

3. A method as in claim 1, further comprising updating the first and second databases to obtain information on changes in the network.

4. A method as in claim 3, wherein the changes include changes in software and hardware configurations in the selected devices.

5. A method as in claim 3, wherein the updating includes adding information on a new device that has the predetermined device attributes to both the first and second databases after the new device is connected to the network.

6. A method as in claim 1, wherein the selected device is selected based on a parameter that indicates a status of a link of the selected device associated with performing the service.

7. A method as in claim 6, wherein the parameter includes information on at least one of a group consisting of latency, throughput, hop count, cost, reliability, and security of a routing path associated with performing the service.

8. A method as in claim 1, wherein the selected device is selected based on available hardware resources for performing the service.

9. A method as in claim 8, wherein the available hardware resources for performing the service include processing power and memory capacity of the selected device.

10. A network for information processing, comprising:
    communication links for transmitting communication signals;
    a plurality of passive devices connected to said communication links to process said communication signals, said passive devices having services that cannot be modified while connected to said communication links;
    a plurality of active devices connected to said communication links to process said communication signals, said active devices being programmable to perform an existing service and to install and perform a new service while being connected to said communication links; and
    at least one active topology server connected to communicate with said passive and active devices and configured to maintain a first database with information about topology of said passive and active devices and a second database with information about topology, software and hardware configurations of only said active devices, wherein said active topology server combines and uses said first and second databases to select a desired active device based on its network location, software, and hardware to perform a service when said service is installed in said desired active device and to install said service in said desired active device when said service is not installed in any of said active devices.

11. A network as in claim 10, wherein said passive and active devices communicate based on the Internet Protocol and said active topology server is operable to maintain said first database according to the Open Shortest Path First protocol.

12. A network as in claim 10, wherein said active topology server is operable to communicate with a new active device connected to at least one of said communication links and to add entries for a network address, software and hardware resources of said new active device to said first and second databases.

13. A network as in claim 10, wherein said desired active device is selected at least in part based on latency, throughput, hop count, cost, reliability, or security of a path connecting said desired active device for performing the service.

14. A network as in claim 10, wherein said desired active device is selected at least in part based on its processing power and memory capacity for performing said service.

15. A method for operating a network, comprising:
    forming a first database having information about topology of devices connected in a network;
    forming a second database to include information about topology, installed software, and hardware resources of only active devices which are programmable to perform an existing service and to install and perform a new service while connected to the network;
    determining whether a service is installed in one or more of the active devices when the service is requested to be performed on a target device in the network;
    selecting a suitable active device which has the service installed to perform the service when the service is installed; and
    installing the service in at least one active device when the service is not available at a time of the request,
    wherein either of an active device for performing the service and an active device for installing the service is selected according to a property of at least one path from the active device to the target device and hardware resources available for performing the service based on the first and second databases.

16. A method as in claim 15, wherein the second database is formed by:
    establishing communication with each active device;
    creating new entries for an active device which is not in the second database;

retrieving data on link paths, installed software, and hardware information from each active device; and entering received data in respective entries of the second database.

17. A method as in claim 15, wherein the suitable active device for performing the service is selected by:

searching the second database for an optimized active device that has a link to the target device which is optimized according to a link parameter that indicates a status of the link;

determining whether the optimized active device has sufficient hardware resources available for performing the service when the optimized active device is found; and searching the second database for a substitute active device that has sufficient resources for performing the service when the optimized active device is not found or when the optimized active device does not have sufficient hardware resources for performing the service.

18. A method as in claim 15, wherein the first database is formed by receiving communication signals from all devices in the network based on a routing protocol.

19. A method as in claim 18, wherein the network is based on the Internet Protocol and the routing protocol is the Open Shortest Path First protocol.

20. A method as in claim 15, wherein the property of the at least one path includes latency, throughput, hop count, cost, reliability, or security of the path.

21. A computer in a network having a storage device containing executable routines that, when executed by a computer processor, causes the computer to:

form a first database that includes information about topology of devices connected in a network;

form a second database on topology of only selected devices that have predetermined device attributes among the devices, the second database including at least a software configuration and a hardware configuration of the selected devices; and combine the first and second databases to choose a selected device to perform a service when the service is installed in the selected device or to install the service in the selected device when the service is not installed in the network.

22. A computer as in claim 21, wherein the predetermined device attributes include installing and performing a new service while connected to communicate with the network.

23. A computer as in claim 21, wherein the executable routines further causes the computer to update the first and second databases to obtain information on changes in the network.

24. A machine-readable medium having thereon instructions which are executable by a processor of a machine to cause the machine to:

form a first database that includes information about topology of devices connected in a network;

form a second database on topology of only selected devices that have predetermined device attributes among the devices, the second database including at least a software configuration and a hardware configuration of the selected devices; and combine the first and second databases to choose a selected device to perform a service when the service is installed in the selected device or to install the service in the selected device when the service is not installed in the network.

* * * * *